Figure 7:
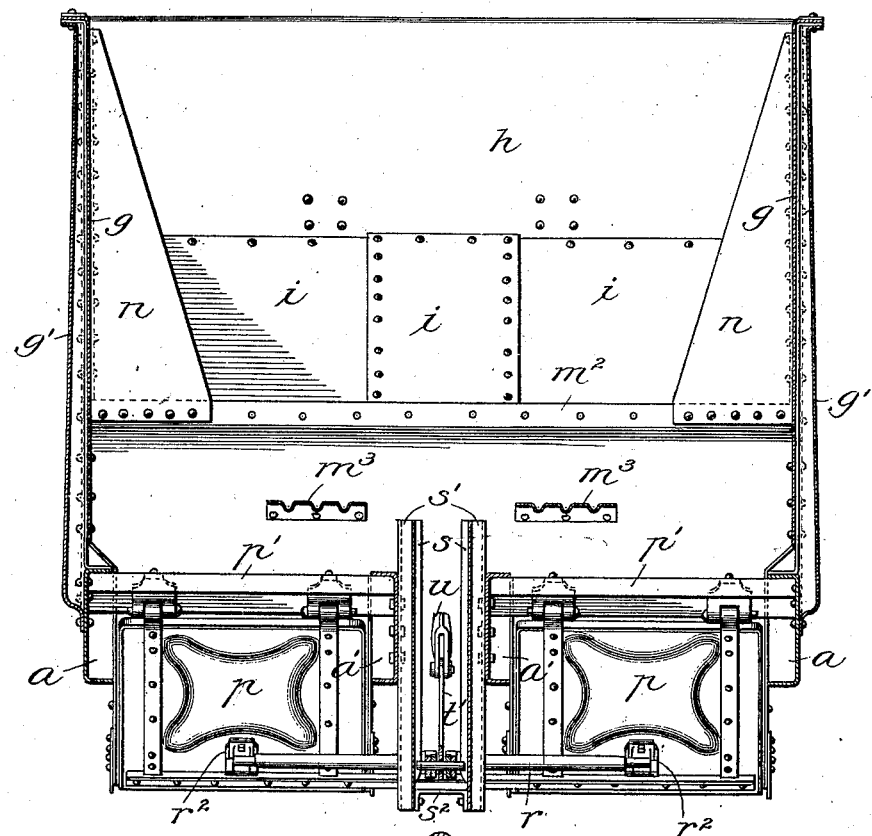

No. 647,908. Patented Apr. 17, 1900.
C. T. SCHOEN & J. M. HANSEN.
HOPPER BOTTOM CAR.
(Application filed Aug. 10, 1899.)
(No Model.) 8 Sheets—Sheet 1.
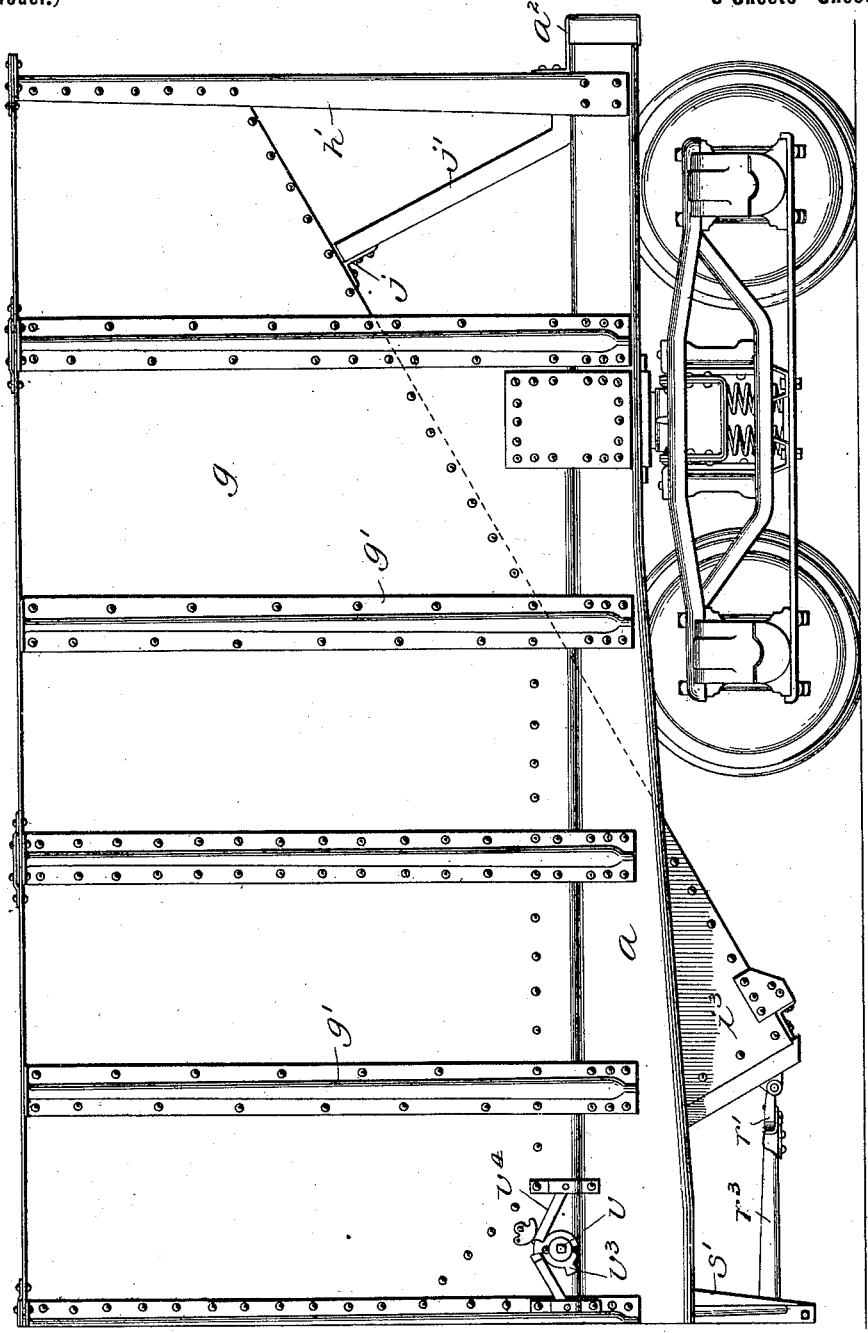
WITNESSES:
INVENTORS
Charles T. Schoen
John M. Hansen
BY
Wm N. Finnell
ATTORNEY

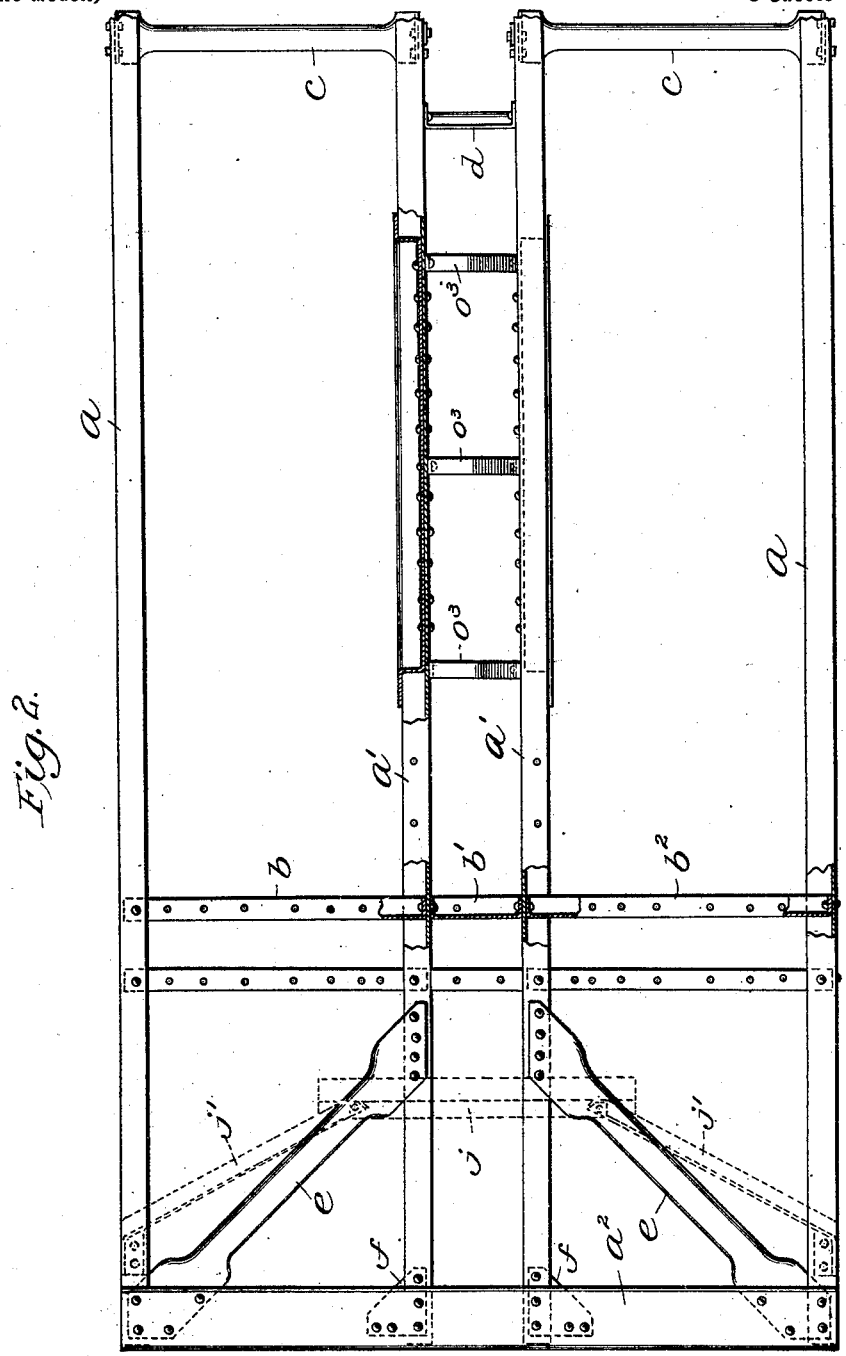

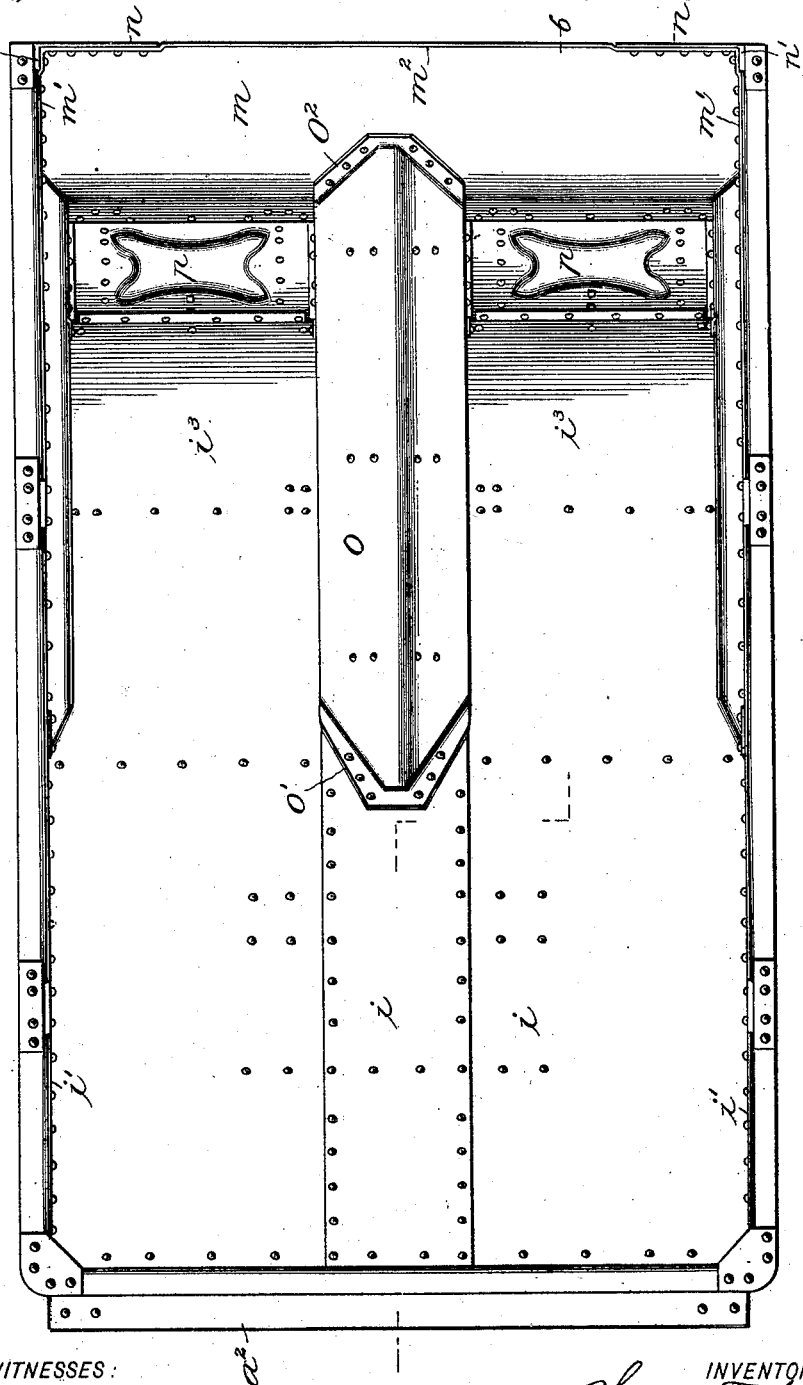

No. 647,908. Patented Apr. 17, 1900.
C. T. SCHOEN & J. M. HANSEN.
HOPPER BOTTOM CAR.
(Application filed Aug. 10, 1899.)
(No Model.) 8 Sheets—Sheet 4.
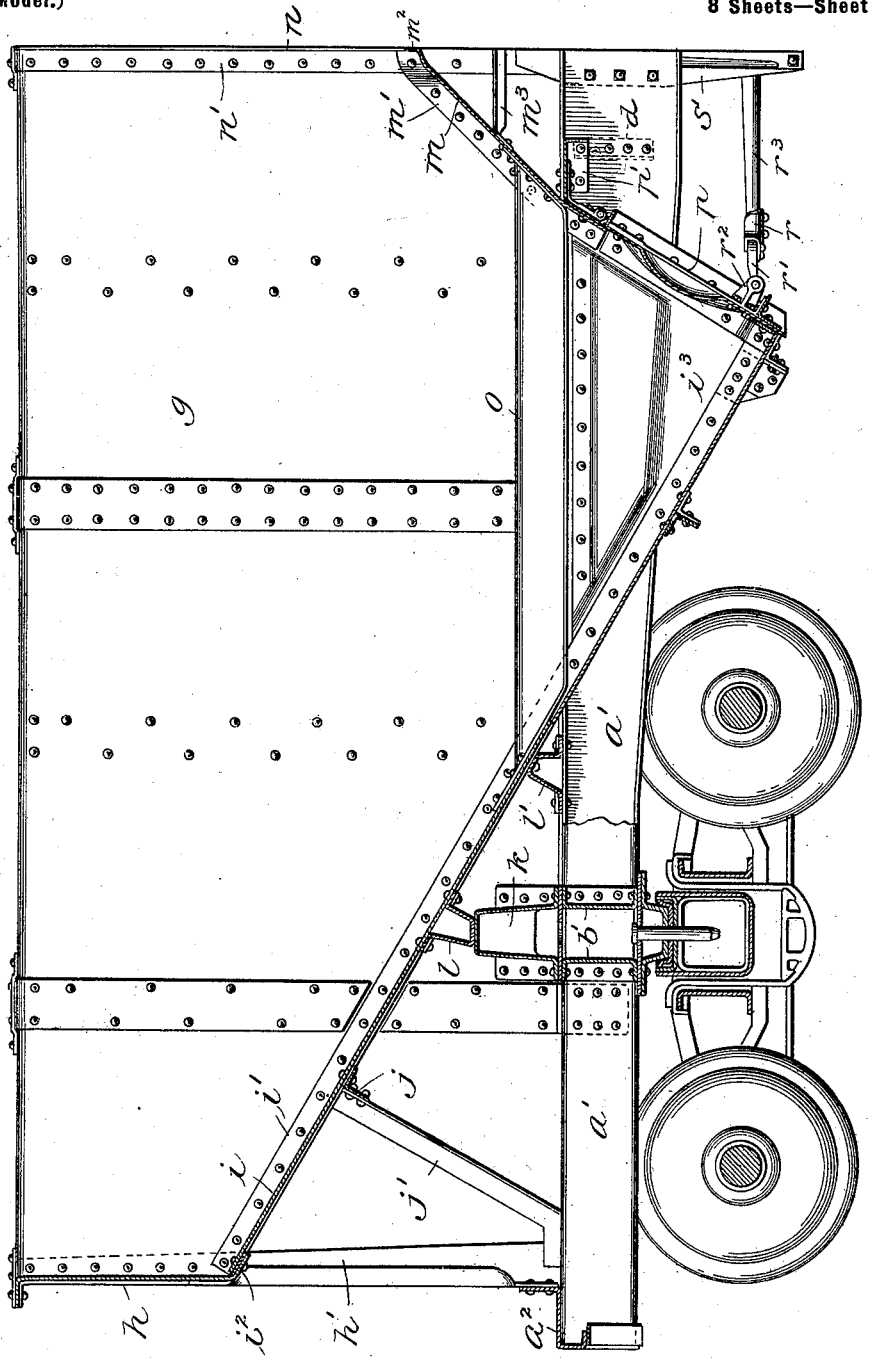
WITNESSES:
Harry S. Rohrer,
Nellie Callahan.
INVENTORS
Charles T. Schoen
John M. Hansen
BY
Wm H. Finckel
ATTORNEY.

No. 647,908. Patented Apr. 17, 1900.
C. T. SCHOEN & J. M. HANSEN.
HOPPER BOTTOM CAR.
(Application filed Aug. 10, 1899.)

(No Model.) 8 Sheets—Sheet 5.

WITNESSES:
Harry S. Rohrer.
Nellie Callahan.

INVENTORS
Charles T. Schoen
John M. Hansen
BY
Wm. H. Finckel
ATTORNEY.

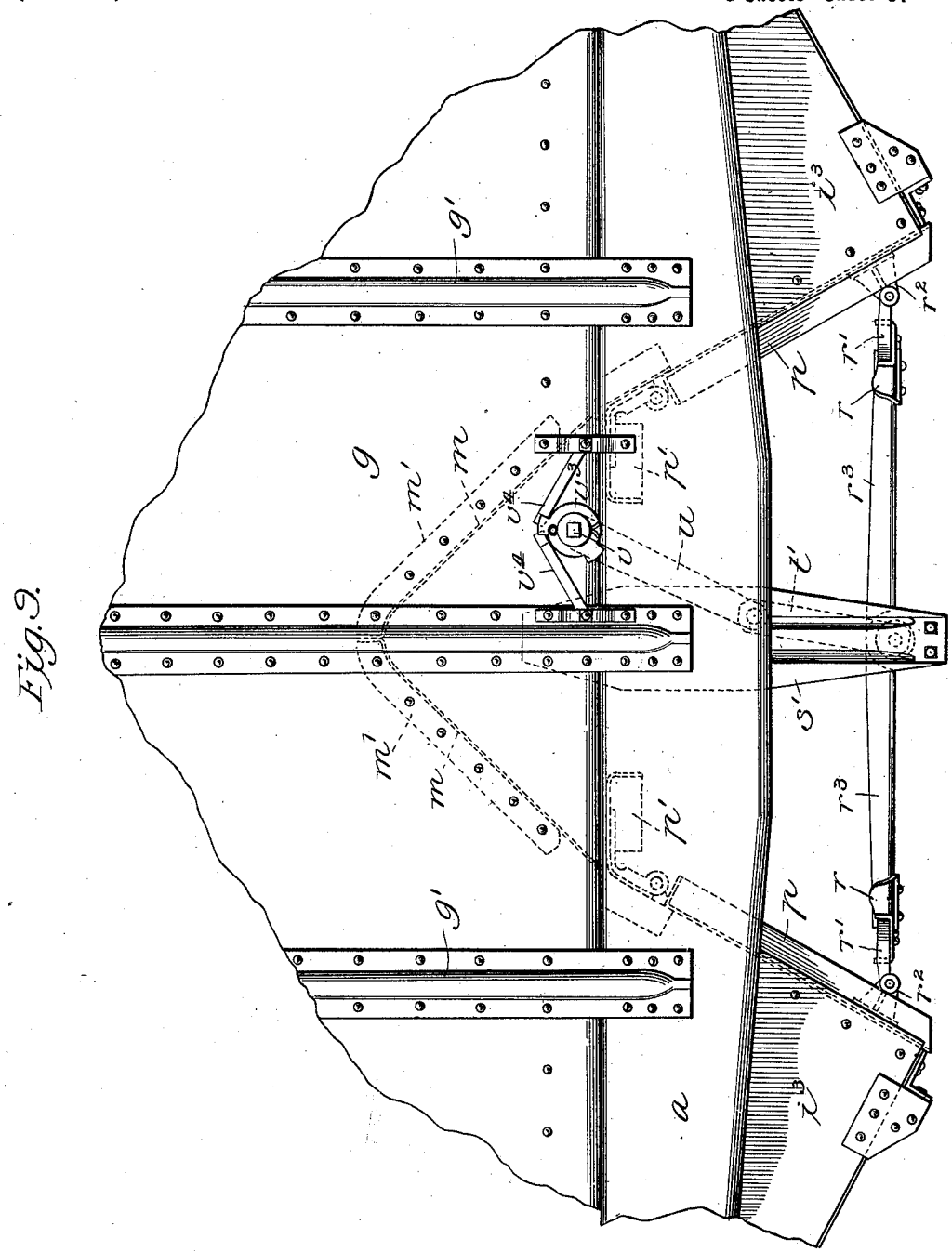

No. 647,908. Patented Apr. 17, 1900.
C. T. SCHOEN & J. M. HANSEN.
HOPPER BOTTOM CAR.
(Application filed Aug. 10, 1899.)
(No Model.) 8 Sheets—Sheet 7.
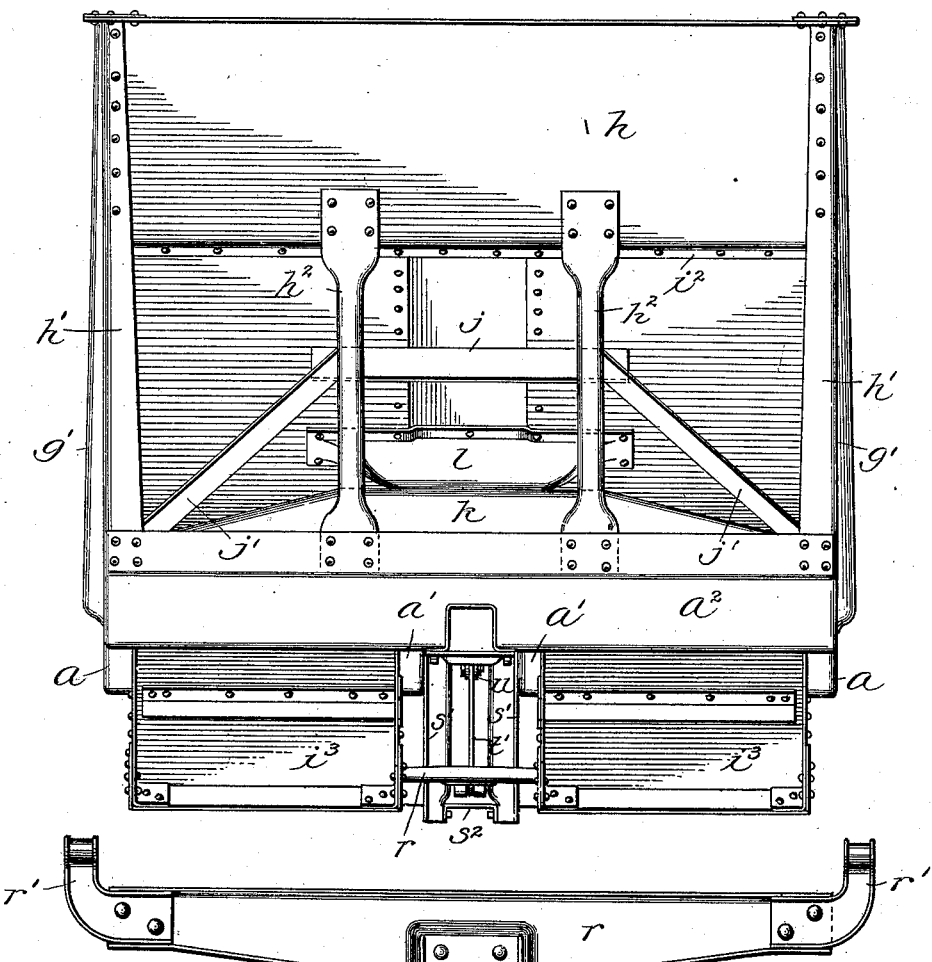
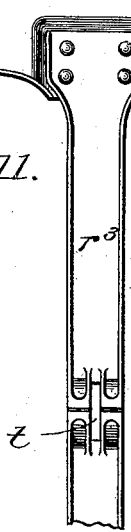
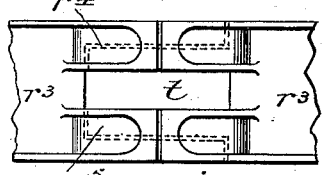
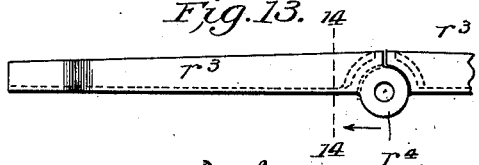
WITNESSES:
Harry S. Rohrer
Nellie Callahan
INVENTORS
Charles T. Schoen
John M. Hansen
BY
WM H. Finckel
ATTORNEY.

No. 647,908. Patented Apr. 17, 1900.
C. T. SCHOEN & J. M. HANSEN.
HOPPER BOTTOM CAR.
(Application filed Aug. 10, 1899.)
(No Model.) 8 Sheets—Sheet 8.
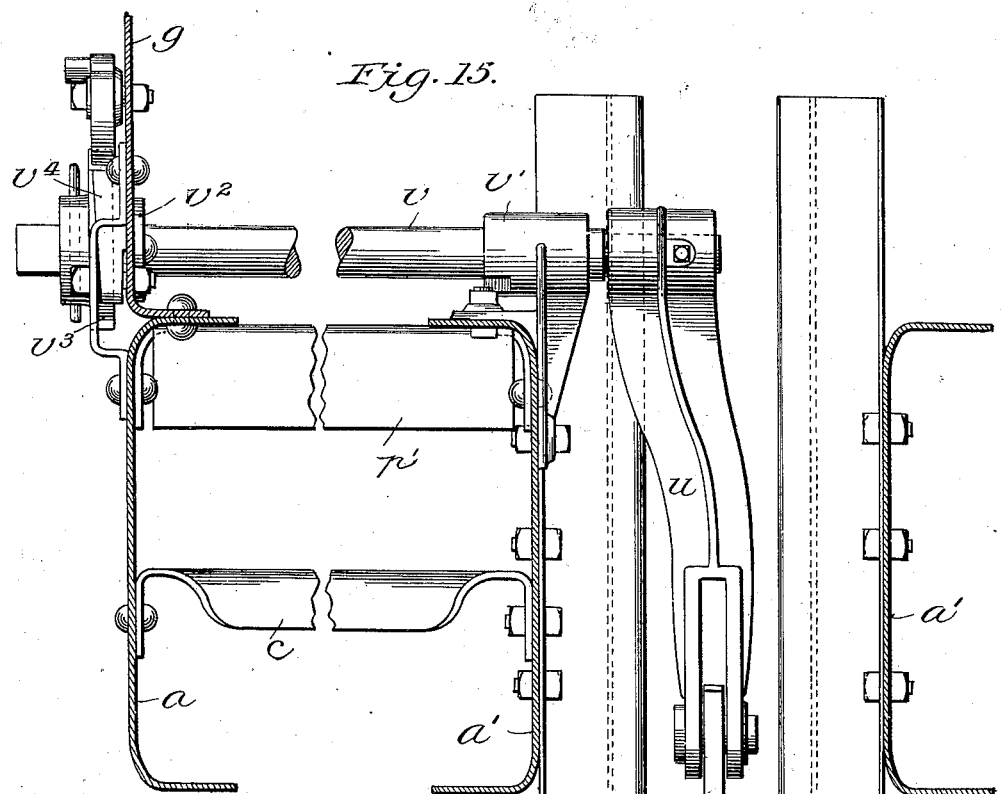
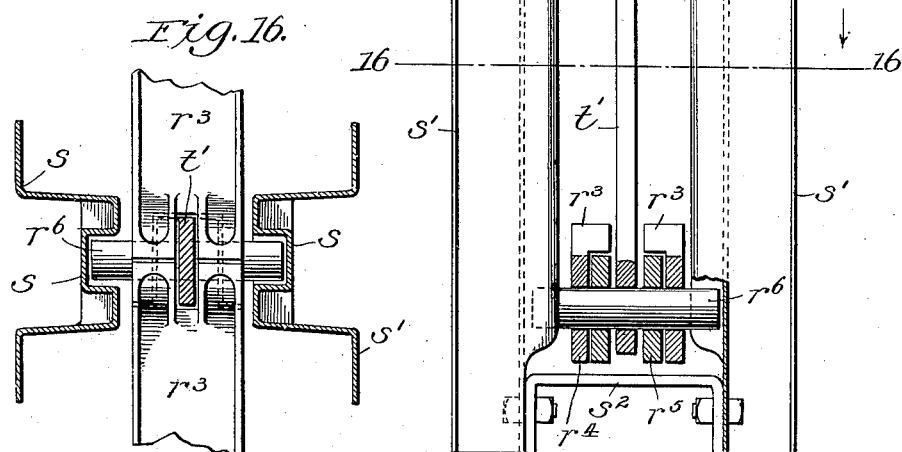
WITNESSES:
Harry S. Rohrer,
Nellie Callahan
INVENTORS
Charles T. Schoen
John M. Hansen
BY
Wm. F. Finckel
ATTORNEY

UNITED STATES PATENT OFFICE.

CHARLES T. SCHOEN, OF PHILADELPHIA, AND JOHN M. HANSEN, OF BELLEVUE, PENNSYLVANIA, ASSIGNORS TO THE PRESSED STEEL CAR COMPANY, OF PITTSBURG, PENNSYLVANIA.

HOPPER-BOTTOM CAR.

SPECIFICATION forming part of Letters Patent No. 647,908, dated April 17, 1900.

Application filed August 10, 1899. Serial No. 726,819. (No model.)

*To all whom it may concern:*

Be it known that we, CHARLES T. SCHOEN, residing at Philadelphia, in the county of Philadelphia, and JOHN M. HANSEN, residing at Bellevue, in the county of Allegheny, State of Pennsylvania, citizens of the United States, have invented certain new and useful Improvements in Hopper-Bottom Cars, of which the following is a full, clear, and exact description.

This invention relates to the construction of hopper-bottom cars, and more especially to that class of cars in which the parts are formed of sheet or plate steel pressed to shape; and it also relates to a special form of operating mechanism for the doors of the discharge-chutes or hopper-bottoms of such cars.

In the preferred form of carrying out our invention we construct the underframe of pressed-steel center sills, side sills, and end sills, riveted together and braced laterally by transoms or braces of similar construction, and we erect upon the sills the body of the car, the sides rising from the side sills and the ends being secured to the sides and supported from the underframe and the bottom or floor inclined from opposite ends downwardly toward the center of the car through and beneath the underframe to form discharge chutes or hoppers. The body-bolsters are erected above the underframe, and interposed between such bolsters and the under side of the floor are bellied girders, there being other girders secured to the inclined ends of the floor and supported by struts rising from the underframe. The interior of the body of the car is divided by a central transverse cone and side wings built into the same, and it is also divided by longitudinal cones, thus making four pockets or discharge chutes or hoppers. Beneath the transverse cone the doors are suspended by their upper ends, so as to swing open and shut from their lower ends, and at their lower ends these doors are connected by spreaders which are jointed at their meeting ends after the manner of a toggle-lever, and this joint has a vertical movement in guides, and the movement is controlled by a shaft and connecting-links, all as we will proceed now more particularly to set forth and finally claim.

We have shown our invention embodied in a steel car of approved construction, but wish it to be understood that we do not limit our invention to the single illustration exhibited in the accompanying drawings, and with this statement we will proceed to describe our invention with reference to the accompanying drawings.

In the accompanying drawings like parts are similarly designated in the several views.

Figure 8:
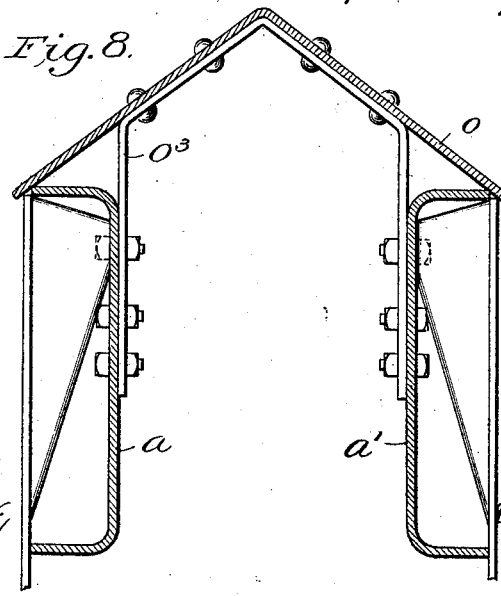

Figure 1 is a side elevation of one-half of the car. Fig. 2 is a top plan view and partial section of the underframe. Fig. 3 is a side view, and Fig. 4 a transverse section, taken in the plane of line 4 4, Fig. 3, of one of the sill-braces. Fig. 5 is a top plan view. Fig. 6 is a longitudinal section taken substantially in the plane of line 6 6, Fig. 5. Fig. 7 is a central transverse section through the center of the transverse cone. Fig. 8 is an enlarged transverse section through one of the longitudinal cones and the center sills. Fig. 9 is a side elevation, on a larger scale, illustrating the door-operating mechanism. Fig. 10 is an end elevation of the car. Fig. 11 is an enlarged plan view of one of the spreaders and part of the other. Fig. 12 is an enlarged plan view of the joint of the spreaders. Fig. 13 is a side elevation of parts of the spreader-connectors. Fig. 14 is a cross-section taken in the plane of line 14 14, Fig. 13. Fig. 15 is a sectional elevation, on a still larger scale, of portions of the door-operating mechanism and its supports. Fig. 16 is a horizontal section taken substantially in the plane of line 16 16 and looking in the direction of the arrow, Fig. 15.

In the construction shown the underframe comprises side sills $a$, center sills $a'$, end sills $a^2$, connected with the side and center sills, parallel transoms $b$ $b'$ $b^2$, riveted to the side sills and center sills in the plane of the truck-bolsters, center braces $c$, the construction of which is shown in detail in Figs. 3 and 4, and braces $d$, between the center sills, and oblique braces $e$, connecting the center sills with the end sills, substantially as shown in Fig. 2. Wherever most needed, the union of the sills may be reinforced by gussets or angle-plates $f$, as between the center sills and the end sills.

The sides $g$ of the car may be erected upon the side sills and their constituent plates united and braced by the side stakes $g'$, which are riveted to the sides and to the side sills. The ends $h$ of the car are elevated above the underframe and connected therewith by corner stakes or posts $h'$, which rise from the underframe and end sills and are riveted to the ends and sides of the car. Uprights $h^2$ also connect the ends $h$ and the underframe.

The floor is composed of a series of plates $i$, those plates next to the sides having vertical flanges $i'$, Fig. 6, which are riveted to the sides of the car, and the several floor-plates $i$ are also riveted to an inturned flange $i^2$ of the ends $h$. The floors are inclined from opposite ends toward the center of the car and are projected through the underframe between the center sills and side sills, so as to form four converging hoppers, pockets, or chutes $i^3$. The floor is provided with transverse girders $j$, here shown of inverted-L shape, riveted to its under side and supported by struts $j'$, rising from the side sills obliquely, as shown more especially in Figs. 1, 2, and 10.

The body-bolsters $k$ are erected above the under frame and are of substantially the construction illustrated in Figs. 6 and 10, and as illustrated in said figures there depends from the under side of the floor and riveted thereto bellied girders $l$, which rest upon the upper surfaces of the bolsters to support the floor at those points. Other girders $l'$ may be interposed between the under side of the floor and the upper side of the underframe at the points where the floor enters the underframe.

The interior of the car is divided transversely by a cone $m$, which is made in two parts, which are riveted to the sides of the car, as shown in Fig. 6, by means of end flanges $m'$ thereon, and which are riveted together by central meeting flanges $m^2$, as shown in Fig. 7. The halves of the transverse cone are braced interiorly by means of the corrugated plates $m^3$. (See Figs. 6 and 7.) Between the flanges $m^2$ and at opposite sides of the car are inserted vertical triangular wings $n$, the lower ends of which are riveted in between the flanges $m^2$ and the upright bases of which are flanged laterally, as shown in Fig. 5 at $n'$, and riveted to the sides of the car. These wings not only add stiffness to the sides of the car and to the cone, but serve to divide and distribute the load. The car is also divided longitudinally, parallel with the center sills, by means of cones $o$, the ends $o'$ of which are riveted to the floor and the ends $o^2$ riveted to the transverse cone. These longitudinal cones aid in dividing the body of the car into four pockets. As shown in Fig. 8, these longitudinal cones are erected upon brackets $o^3$, which are secured to and rise from the center sills $a'$ $a'$. Of course these brackets $o^3$ greatly reinforce the cones $o$.

The doors $p$ may be of any approved construction and hinged at the mouths of the chutes from supporting-beams $p'$, suitably erected between the center and side sills. Where these doors are made of pressed steel, their centers may be embossed, as shown. The doors of the several chutes may be operated singly or in pairs, and we have shown mechanism for simultaneously operating the four doors in pairs, and this mechanism is constructed as follows: There is employed a beam $r$, at each end of which is an eye $r'$, and this beam is of a width to reach from the center of one door to the center of a companion door, and the beam is there connected with the said doors by its eyes $r'$ $r'$ engaging companion hinge-pieces $r^2$ on the doors, the union of the eyes and hinge-pieces being effected by any suitable pintles which will permit movement of the parts. Midway of the beam $r$ is a shank-piece $r^3$, projecting substantially at right angles from the said beam and of trough shape in cross-section, substantially as shown in Fig. 14. The shanks $r^3$ of opposite beams $r$ have their adjacent ends formed, respectively, with a socket $r^4$ and a tongue $r^5$, which when assembled as in Figs. 11, 12, and 13 are united by a transverse pin $r^6$ and in a manner similar to a knuckle-joint or rule-joint. The parts herein designated $r$, $r'$, and $r^3$ constitute a "spreader," and we herein so refer thereto. It will be observed that these spreaders have their eyes $r'$ $r'$ riveted or otherwise secured to the ends of the beams $r$ and also have their shanks $r^3$ similarly applied to the beams. Now it is an ascertained fact that the eyes and the shanks are exposed to the greatest danger of breakage and wear, and by making them separable from the beams the spreaders may be readily and economically repaired and without the necessity of replacing the whole spreader when any one or more of its parts are damaged. There is also a considerable economy of material gained in the construction of spreaders in accordance with our invention, and where pressed steel is used, wholly or in part, in their construction there is a large saving in dead-weight and a very material increase in strength and durability. The spreaders have their connecting-pin $r^6$ projecting beyond their sides, as shown more especially in Figs. 15 and 16, and this pin travels in grooves $s$ in vertical guides $s'$, which depend from and are secured to the center sills $a'$ $a'$ and are parallel to one another, and the lower ends of these guides are united and stayed by transverse braces $s^2$. The centers of the shanks $r^3$ are cut out, as shown at $t$, Figs. 11 and 12, and this central opening provides for the entrance of a link $t'$ to engage the pin $r^6$, and this link extends vertically between the guides $s'$ $s'$ and is jointed to a crank-arm $u$, which is secured to a shaft $v$, which in turn has bearings in a bracket $v'$ on one of the center sills and in a plate $v^2$ on the side of the car. Outside of the car the shaft $v$ is provided with a ratchet $v^3$, which is engaged by pawls $v^4$ to lock the mechanism when the doors are in both the open and closed positions. The end of the shaft $v$ may be squared to receive any suitable operating key or wrench. Now it will be understood that by rotation of the shaft $v$ so as to elevate the crank-arm $u$ the link $t'$ will be drawn upwardly, and it in turn will draw up the meeting ends of the spreaders, and thereby cause the doors to open, while a reverse movement of the parts will close the doors. In this way is supplied a very simple mechanism for directly and positively moving the doors.

What we claim is—

1. A steel car, having an underframe comprising side sills and center sills connected by end sills and transoms, a body-bolster erected above said underframe, a hopper-bottom mounted on said underframe and supported thereupon by girders one of which is bellied and interposed between the under side of the bottom and the upper surface of the body-bolster, at each end of the car and rests upon such bolster, substantially as described.

2. In a steel car, having its body divided longitudinally and transversely into hoppers, pockets or chutes, the transverse dividing member being composed of a cone divided at its apex and receiving vertical triangular wings projecting from the sides into the body of the car and between the members of the transverse cone and secured to both, substantially as described.

3. A hopper-bottom car, provided with doors, combined with door-operating mechanism, comprising transverse beams $r$, having eyes $r'$ formed of separate and independent pieces and secured to the ends of the beams and pivoted to the doors, and shanks $r^3$ also formed separate from the beams and secured to the said beams and connected to each other by a knuckle-joint, the said beams, eyes and shanks constituting spreaders, and means to move the said spreaders simultaneously to open and close the doors, substantially as described.

4. In a double-hopper-bottom car, the combination of pairs of doors, jointed spreaders connected with each other and with the said doors, and each composed of a beam $r$ having eyes $r'$ secured in its ends and a shank $r^3$ secured at right angles to the beam, vertically-grooved guides to receive the connection of the spreaders, and means to actuate the spreaders within said guides, substantially as described.

5. In a hopper-bottom car, the combination with the hopper-doors, of spreaders each composed of a beam $r$ having eyes $r'$ and a shank $r^3$, the said shanks connected by a knuckle-joint, the pin of which joint projects laterally beyond the said joint at both sides, vertically-grooved guides with which the projecting ends of such pin engage, and means to raise and lower said spreaders within said guides to open and close the doors, substantially as described.

6. In a hopper-bottom car, the combination with the doors, of spreaders connected with the doors and each composed of a beam $r$ having eyes $r'$ and a shank $r^3$, a knuckle-joint connecting the shanks of the spreaders, vertically-grooved guides erected between the center sills of the car and receiving the said knuckle-joint of the spreaders, a crank-shaft, and a link connecting the crank-shaft and the knuckle-joint, substantially as described.

7. In a hopper-bottom car, the combination with the doors, of spreaders connected with the doors and each composed of a beam $r$ having eyes $r'$ and a shank $r^3$, a knuckle-joint connecting the shanks of the spreaders, vertically-grooved guides erected between the center sills of the car and receiving the said knuckle-joint of the spreaders, a crank-shaft, and a link connecting the crank-shaft and the knuckle-joint, and means to hold the said shaft to retain the doors in both the closed and opened positions, substantially as described.

In testimony whereof we have hereunto set our hands this 21st day of July, A. D. 1899.

CHARLES T. SCHOEN.
J. M. HANSEN.

Witnesses as to Charles T. Schoen:
   CHAS. D. MCGLAUGHLIN,
   ARMIN H. WILLS.

Witnesses as to J. M. Hansen:
   H. E. SWARTZ,
   J. C. HENRY.